(No Model.)
A. H. MOYES.
AUTOMATIC FLUID PRESSURE BRAKE.
No. 563,673. Patented July 7, 1896.
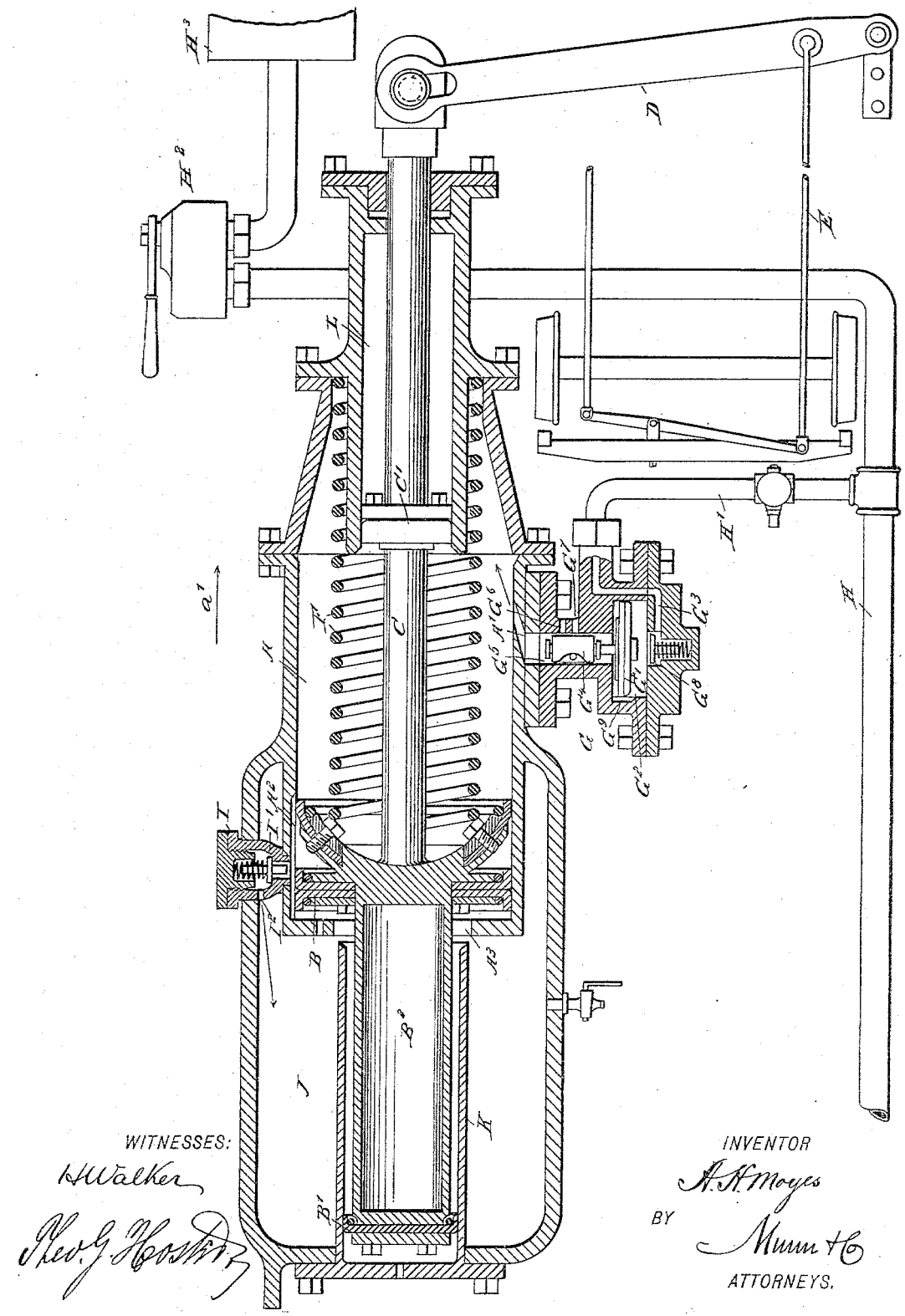
WITNESSES:
INVENTOR
ATTORNEYS.

UNITED STATES PATENT OFFICE.

ALEXANDER HILL MOYES, OF OGDEN, UTAH.

AUTOMATIC FLUID-PRESSURE BRAKE.

SPECIFICATION forming part of Letters Patent No. 563,673, dated July 7, 1896.

Application filed May 9, 1895. Serial No. 548,765. (No model.)

*To all whom it may concern:*

Be it known that I, ALEXANDER HILL MOYES, of Ogden, in the county of Weber and Territory of Utah, have invented new and useful Improvements in Automatic Fluid-Pressure Brakes, of which the following is a full, clear, and exact description.

The invention relates to fluid-pressure brakes of the Westinghouse type, and its object is to provide certain new and useful improvements in fluid-pressure brakes whereby a quick and positive action of applying and releasing the brakes is obtained and the tension of the brakes is graduated without completely releasing the same.

The invention consists of certain parts and details and combinations of the same, as will be fully described hereinafter, and then pointed out in the claim.

Reference is to be had to the accompanying drawing, forming a part of this specification, in which the figure is a sectional plan view of the improvement.

The automatic fluid-pressure brake is provided with a brake-cylinder A, attached in any suitable manner to each car, and provided with a piston B, carrying a push-rod C, connected at its outer end with a lever D, having a connection by a link E with the brake mechanism of the car. A spring F presses on the piston B, so as to hold the latter in its normal position, as shown in the drawing, that is, at the rear end of the cylinder A. The cylinder A is connected with a double-acting valve G, containing a piston $G'$ in a cylinder $G^2$, connected by a port $G^3$ with a branch pipe $H'$, leading from the train-pipe H, connected in the usual manner with the engineer's valve $H^2$ and the main reservoir $H^3$. The piston $G'$ carries a slide-valve $G^4$ in the passage $G^5$, leading from the inner end of the cylinder $G^2$ to a port $A'$, leading into the cylinder A near the front end thereof. The slide-valve $G^4$ normally closes two ports $G^6$ and $G^7$, located one in front of the other, as shown in the drawing, so that when the piston $G'$ moves outward in the cylinder $G^2$ upon reducing the pressure in the train-pipe H, then the slide-valve $G^4$ moves with the said piston and uncovers first the port $G^6$, and in case of emergency and by a further reduction of pressure in the train-pipe also uncovers the port $G^7$, to connect the interior of the cylinder A with the outer air.

A spring-pressed disk $G^8$ in the outer cap of the valve G is engaged by the piston $G'$ as the latter moves outward upon a reduction of air-pressure in the train-pipe, as previously described. A feed-groove $G^9$ in the cylinder $G^2$ serves to connect the outer end thereof with the passage $G^5$ to permit of charging the cylinder A with air from the train-pipe whenever the engineer's valve $H^2$ is moved into the corresponding position.

In the rear end of the cylinder A is arranged a feed-groove $A^2$, into which opens a check-valve I, provided with a spring-pressed valve $I'$, held normally on its seat, and adapted to be pressed off its seat by pressure passing into the cylinder A and to the feed-groove $A^2$ to the inner side of the said valve $I'$. A port $I^2$ in the body of the check-valve I connects the latter with the interior of an auxiliary reservoir J, which forms an integral part of the cylinder A, and is connected with the rear end thereof by an opening $A^3$ in the rear head of the cylinder, as is plainly shown in the drawing.

Into the auxiliary reservoir J extends a small cylinder K, terminating with its inner, open end near the opening $A^3$, and in this cylinder K is fitted to slide a piston $B'$, held on a piston-rod $B^2$, forming part of the piston B. On the push-rod C of the piston B is arranged a piston $C'$, operating in a cylinder L, attached to the front end of the cylinder A.

The operation is as follows: When the several parts are in the position shown in the drawing, then the air from the train-pipe passes through the branch pipe $H'$ and the port $G^3$ into the cylinder $G^2$ of the double-acting valve G, to force the piston $G'$ in the said cylinder into an innermost position, so that the ports $G^6$ and $G^7$ are closed by the slide-valve $G^4$, and the air can pass through the feed-groove $G^9$, passage $G^5$, and port $A'$ into the brake-cylinder A. The piston B is now in its rearmost position, so that the brake mechanism is in a released position and the feed-groove $A^2$ is uncovered, to permit the air to pass from the cylinder A through the feed-groove $A^2$ into the check-valve I, to press the valve $I'$ therein, to permit the air to pass through the port $I^2$ into the auxiliary reservoir J, to charge the latter with the same pressure as that contained in the train-pipe H. Now when it is desired to apply the brakes the pressure in the train-pipe H is reduced, and consequently a reduction of pressure takes place in the cylinder $G^2$, whereby the piston $G'$ is forced outward by the preponderance of pressure in the cylinder A. The slide-valve $G^4$ uncovers the port $G^6$, and, in case of emergency stop and by a further reduction of pressure in the train-pipe, the other port $G^7$ also. The cylinder A is thus connected at its front end with the outer air, and consequently the air in the said cylinder A passes to the outside, thereby leaving a preponderance of pressure in the auxiliary reservoir J, to act against the rear end of the piston B and force the latter forward in the direction of the arrow $a'$ to apply the brakes in the usual manner. The spring F is now compressed, and whenever it is desired to release the brakes air is permitted to pass from the train-pipe H into the double-acting valve G, to force the piston therein inward, to close the ports $G^6$ and $G^7$. Air now also passes through the double-acting valve G into the cylinder A, to move the piston B back to its forward position—that is, in the inverse direction of the arrow $a'$.

The above-described operation is then repeated—that is, the auxiliary reservoir J is recharged in case of any leakage taking place.

The purpose of the cylinder K and enlarged piston $B^2$ is to reduce the interior size of the reservoir J and also to steady the piston B in its operation. The cylinder L and piston C' are provided to guide the cylinder B and effect a tight joint between the rod C and cylinder A.

It will be observed that by projecting the brake-cylinder into the auxiliary reservoir, as shown, the orifice $I^2$ is placed in direct communication with the said reservoir, and thereby avoiding the use of more complicated means for establishing this communication.

Having thus described my invention, I claim as new and desire to secure by Letters Patent—

In a fluid-pressure brake, an auxiliary reservoir, a brake-cylinder rigid therewith, a second cylinder within the auxiliary reservoir, a third cylinder rigid with the brake-cylinder, and at the end opposite the auxiliary reservoir and communicating with the brake-cylinder, a piston in the brake-cylinder, a second piston within the cylinder in the auxiliary cylinder and fixed to the brake-piston, and a third piston operating in the third cylinder and connected with the brake-piston, substantially as described.

ALEXANDER HILL MOYES.

Witnesses:
JNO. D. MURPHY,
DAVID S. TRACY.